(12) United States Patent
Goli et al.

(10) Patent No.: US 9,969,402 B2
(45) Date of Patent: May 15, 2018

(54) TRANSMISSION SYSTEM HAVING EFFICIENCY-BASED SPEED CONTROL

(71) Applicant: Caterpillar Inc., Peoria, IL (US)

(72) Inventors: Suman Goli, Edwards, IL (US); Brian Douglas Hoff, East Peoria, IL (US); Mark Edward Rettig, East Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 344 days.

(21) Appl. No.: 14/867,647

(22) Filed: Sep. 28, 2015

(65) Prior Publication Data

US 2017/0088138 A1 Mar. 30, 2017

(51) Int. Cl.
| | |
|---|---|
| *B60W 30/188* | (2012.01) |
| *B60W 10/06* | (2006.01) |
| *B60W 10/10* | (2012.01) |
| *B60W 10/103* | (2012.01) |
| *B60W 10/105* | (2012.01) |
| *F16H 61/66* | (2006.01) |
| *F16H 63/50* | (2006.01) |
| *F02D 29/02* | (2006.01) |

(Continued)

(52) U.S. Cl.
CPC .......... *B60W 30/188* (2013.01); *B60W 10/06* (2013.01); *B60W 10/10* (2013.01); *B60W 10/103* (2013.01); *B60W 10/105* (2013.01); *E02F 9/2253* (2013.01); *F02D 29/02* (2013.01); *F16H 61/66* (2013.01); *F16H 63/50* (2013.01); *B60W 2710/0644* (2013.01); *B60Y 2200/41* (2013.01); *F16H 59/14* (2013.01); *F16H 2061/0096* (2013.01)

(58) Field of Classification Search
None
See application file for complete search history.

(56) References Cited

U.S. PATENT DOCUMENTS

| | | | |
|---|---|---|---|
| 5,479,908 | A | 1/1996 | Grinberg et al. |
| 5,510,982 | A | 4/1996 | Ohnishi et al. |

(Continued)

FOREIGN PATENT DOCUMENTS

| | | |
|---|---|---|
| EP | 2 851 264 | 6/2013 |
| JP | 10-71875 | 3/1998 |

(Continued)

*Primary Examiner* — Jacob S. Scott
(74) *Attorney, Agent, or Firm* — Finnegan, Henderson, Farabow, Garrett & Dunner, LLP (57) ABSTRACT

A transmission system is disclosed as having a transmission configured to receive torque output from a power source and to drive a traction device, and an input device. The transmission system may also have a control module configured to reference a signal from the input device with a map to determine a corresponding speed of the power source, and to determine a margin between an actual and a maximum available torque output of the power source at a current speed. The control module may also be configured to determine a delay time threshold based on the margin, to selectively adjust a speed of the power source mapped to the maximum displaced position of the operator input device based on the margin, and to selectively adjust fueling of the power source at a current displacement position of the operator input device and operation of the transmission based on the signal and the map.

20 Claims, 5 Drawing Sheets

(51) Int. Cl.
*F16H 59/14* (2006.01)
*E02F 9/22* (2006.01)
*F16H 61/00* (2006.01)

(56) References Cited

U.S. PATENT DOCUMENTS

| | | |
|---|---|---|
| 6,866,610 B2 | 3/2005 | Ito |
| 7,074,160 B1 | 7/2006 | Inoue et al. |
| 7,552,712 B1 | 6/2009 | Barngrover et al. |
| 7,771,309 B2 | 8/2010 | Kamada et al. |
| 8,108,136 B2 | 1/2012 | Filev et al. |
| 8,282,531 B2 | 10/2012 | Ishido et al. |
| 8,315,783 B2 | 11/2012 | Hyodo et al. |
| 8,442,729 B2 | 5/2013 | Tsukada et al. |
| 8,538,645 B2 | 9/2013 | Anderson et al. |
| 8,606,474 B2 | 12/2013 | Guo et al. |
| 8,886,422 B2 | 11/2014 | Sujan et al. |
| 2008/0103019 A1 | 5/2008 | Cronin et al. |
| 2008/0269011 A1 | 10/2008 | Sopko et al. |
| 2009/0027072 A1 | 2/2009 | Lin et al. |
| 2012/0253631 A1 | 10/2012 | Li et al. |
| 2012/0310495 A1 | 12/2012 | Nakanishi et al. |
| 2013/0020803 A1 | 1/2013 | Beaudoin |
| 2013/0041561 A1 | 2/2013 | Asami et al. |
| 2013/0244832 A1 | 9/2013 | Kamisetty et al. |
| 2014/0200775 A1 | 7/2014 | Shirao |
| 2016/0076462 A1* | 3/2016 | Hoff .................. F02D 11/105 477/107 |

FOREIGN PATENT DOCUMENTS

| | | |
|---|---|---|
| WO | WO 2014/017166 | 1/2014 |
| WO | WO 2014/071104 | 5/2014 |

\* cited by examiner

TRANSMISSION SYSTEM HAVING EFFICIENCY-BASED SPEED CONTROL

TECHNICAL FIELD

The present disclosure is directed to a transmission system and, more particularly, to a transmission system having efficiency-based engine speed control.

BACKGROUND

Machines, such as wheel loaders, dozers, and other heavy equipment, are used to perform many tasks. To effectively perform these tasks, the machines require an engine that provides significant torque through a transmission to one or more tires. The operator of these machines is typically provided with one or more different foot pedals that are used to control the speed and/or torque of the tires. For example, a right foot pedal can be used to affect engine fueling, while a left foot pedal can be used to affect machine braking. Additional foot pedals may be available in some applications to control connection of the engine to the transmission.

Although the typical foot pedal configuration may be suitable when a mechanical step-change transmission is utilized to transmit power from the engine to the tires, it may be insufficient when a continuously variable transmission (CVT) is utilized. A CVT is an automatic type of transmission that provides an infinite number of output ratios within its operating range. A hydraulic CVT includes a pump and a fluid motor that receives pressurized fluid from the pump. Depending on a discharge flow rate and pressure of the pump and a displacement of the motor, the motor speed and output torque at the tires may be varied. An electric CVT includes a generator and an electric motor that receives current from the generator. Depending on the current supplied to the motor, the motor speed and output torque may be varied. When using a CVT, the goal is to keep the engine at the most efficient speed while still providing the necessary power to meet the operator's commands. In this situation, the strategy described above of using a foot pedal to change only engine fueling may work against the efficiency goal. Therefore, an alternative strategy is required to efficiently control operation of a machine having a CVT.

An alternative method of machine control is described in U.S. Patent Publication No. 2008/0103019 of Cronin et al. that published on May 1, 2008 (the '019 publication). Specifically, the '019 publication describes a continuously variable transmission for a machine. The continuously variable transmission includes a driven element, a first operator interface device, a second operator interface device, and a controller. The controller is configured to receive a first displacement signal associated with the first operator interface device, and a second displacement signal associated with the second operator interface device. The controller is further configured to determine a net operator input value as a function of the first and second displacement signals, and to regulate a torque of the driven element in response to the determined net operator input value.

Although the system of the '019 publication may provide efficient regulation of a speed-controlled CVT by separating engine speed from transmission torque control, it may still be less than optimal. In particular, there may be times when engine speed control, in combination with transmission torque control, can further improve machine efficiencies. And the system of the '019 publication may not capture these efficiencies.

The present disclosure is directed toward solving one or more of the problems set forth above and/or other problems of the prior art.

SUMMARY

One aspect of the present disclosure is directed to a transmission system for use with a mobile machine having a traction device. The transmission system may include a power source configured to generate a torque output, a transmission configured to receive at least a portion of the torque output and to drive the traction device, and an operator input device movable through a range from a neutral position to a maximum displaced position to generate a signal indicative of a desired torque of the traction device and a desired speed of the power source. The transmission system may also include a control module in communication with the power source, the transmission, and the operator input device. The control module may be configured to reference the signal from the operator input device with a map stored in memory to determine a corresponding speed of the power source, to determine a margin between an actual and a maximum available torque output of the power source at a current power source speed, and to determine a delay time threshold based on the margin. The control module may also be configured to selectively adjust a speed of the power source mapped to the maximum displaced position of the operator input device based on the margin and the delay time threshold. The control module may be further configured to selectively adjust fueling of the power source at a current displacement position of the operator input device and operation of the transmission based on the signal and on the map.

Another aspect of the present disclosure is directed to another transmission system transmission system for a mobile machine having a traction device. This transmission system may include a power source configured to generate a torque output, a continuously variable transmission configured to receive at least a portion of the torque output and to drive the traction device, and an operator input device movable through a range from a neutral position to a maximum displaced position to generate a signal indicative of a desired torque of the traction device and a desired speed of the power source. The transmission system may also include a control module in communication with the power source, the continuously variable transmission, and the operator input device. The control module may be configured to reference the signal from the operator input device with a map stored in memory to determine a corresponding speed of the power source, to determine a margin between an actual and a maximum available torque output of the power source at a current speed, and to determine a delay time threshold based on the margin. The control module may also be configured to selectively adjust a speed of the power source mapped to the maximum displaced position of the operator input device based on the margin and the delay time threshold, and to selectively adjust fueling of the power source at a current displacement position of the operator input device and operation of the continuously variable transmission based on the signal and on the map. The control module may be further configured to selectively reduce the speed of the power source mapped to the maximum displaced position when the margin is about equal to or greater than 30%, and to selectively increase the speed of the power source mapped to the maximum displaced position when the margin is about equal to or less than 5%.

In yet another aspect, the present disclosure is directed to a method of operating a machine having a traction device driven by a power source via a transmission. The method may include determining a displacement position of an operator input device that is indicative of a desired torque of the traction device and a desired speed of the power source, and referencing the displacement position with a map to determine a corresponding speed of the power source. The method may also include determining a margin between an actual and a maximum available torque output of the power source at a current speed, determining a margin between an actual and a maximum available torque output of the power source at a current speed, and determining a delay time threshold based on the margin. The method may further include selectively adjusting a speed of the power source mapped to the maximum displaced position of the operator input device based on the margin and the delay time threshold, and selectively adjusting fueling of the power source at a current displacement position of the operator input device and operation of the transmission based on the signal and on the map.

DETAILED DESCRIPTION

Figure 1:
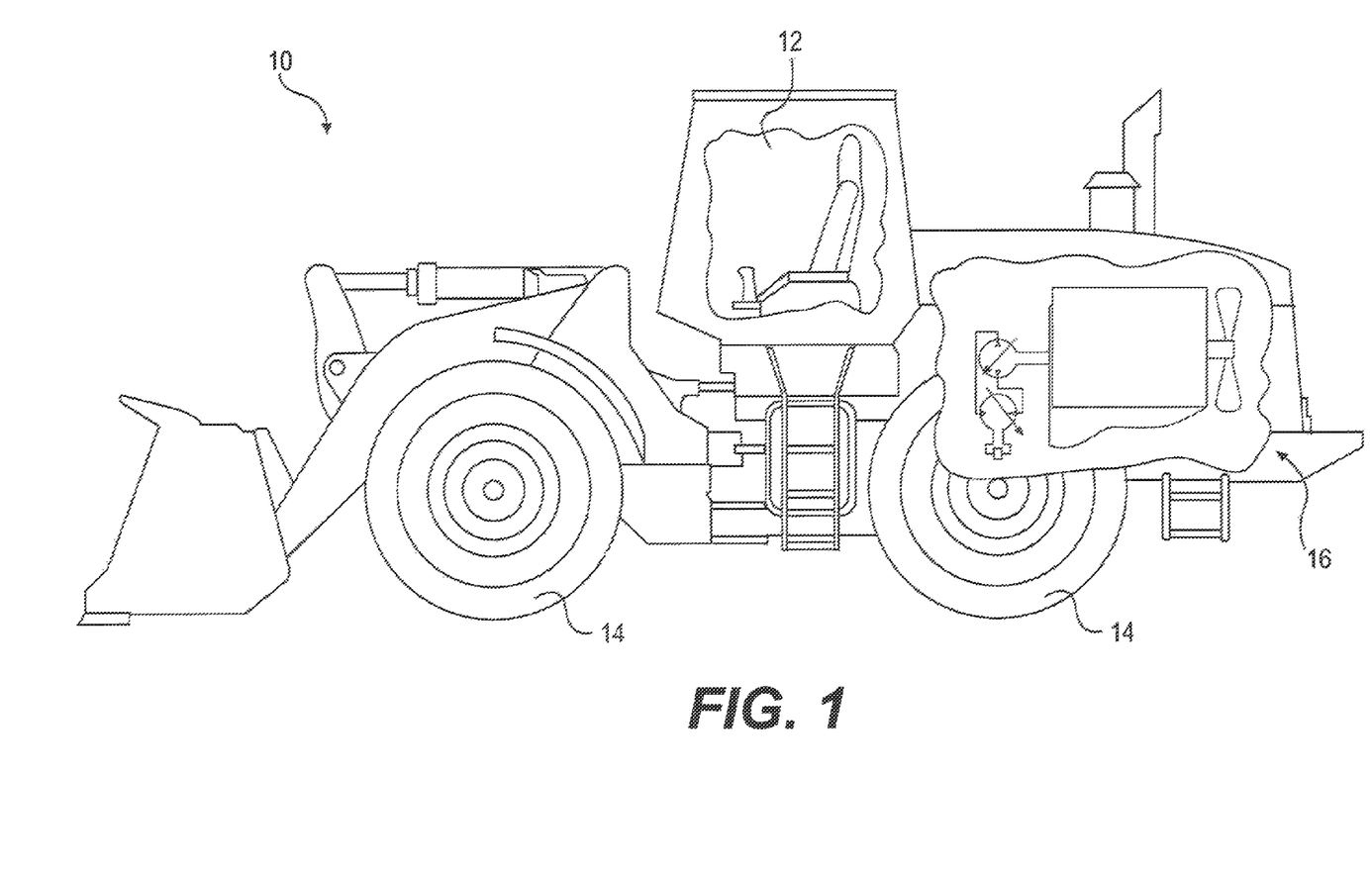
FIG. 1 is a diagrammatic illustration of an exemplary disclosed machine.

FIG. 1 illustrates an exemplary machine 10 having multiple systems and components that cooperate to accomplish a task. The tasks performed by machine 10 may be associated with a particular industry such as mining, construction, farming, transportation, power generation, or any other industry known in the art. For example, machine 10 may embody a mobile machine such as the wheel loader depicted in FIG. 1, a bus, an on or off-highway haul truck, or any other type of mobile machine known in the art. Machine 10 may include an operator station 12, one or more traction devices 14, and a powertrain 16 operatively connected to drive at least one of traction devices 14 in response to signals generated within operator station 12.

Figure 2:
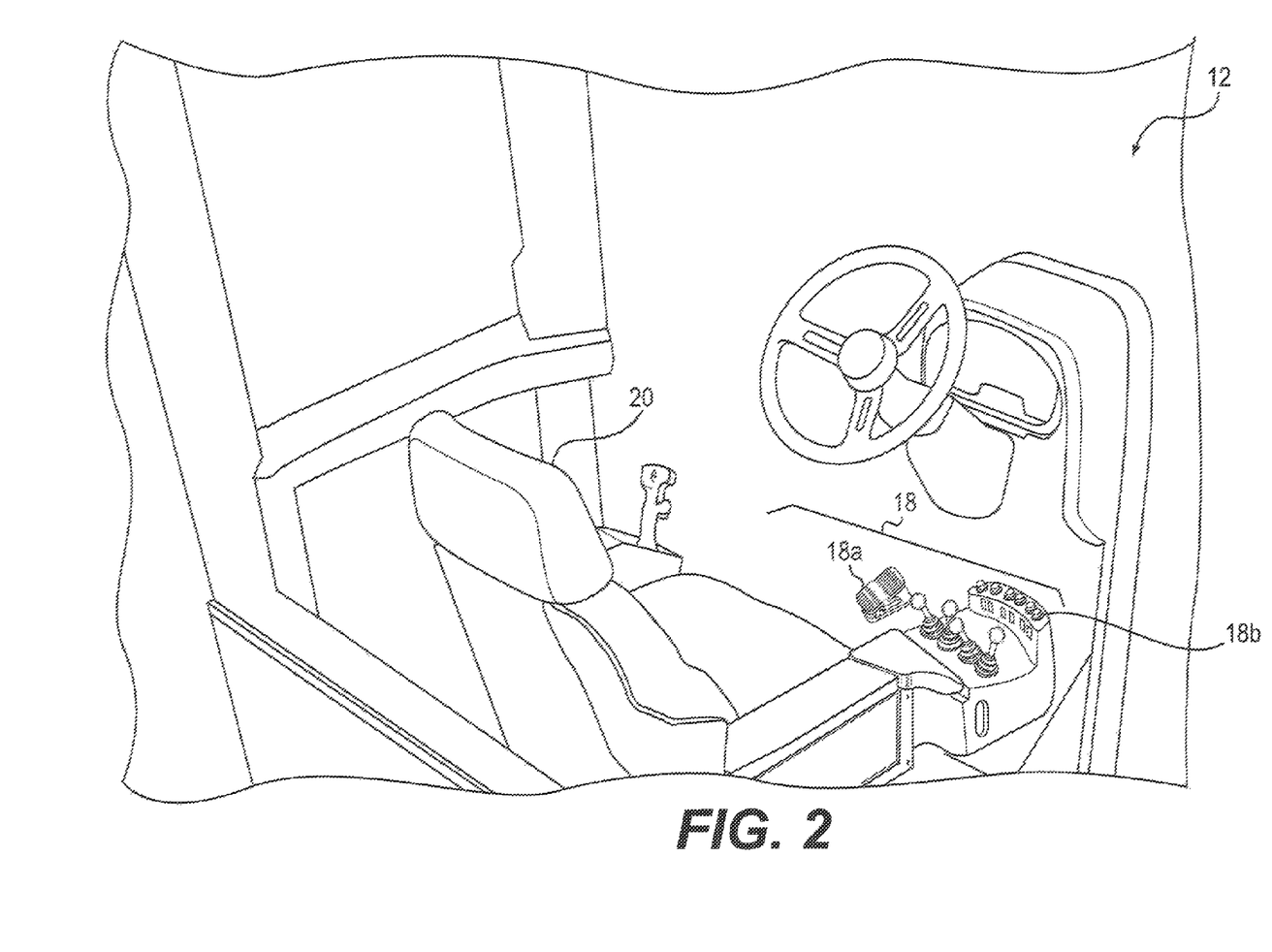
FIG. 2 is a pictorial illustration of an exemplary disclosed operator station for use with the machine of FIG. 1.

As illustrated in FIG. 2, operator station 12 may include devices that receive input from a machine operator indicative of a desired machine operation. Specifically, operator station 12 may include one or more operator interface devices 18 located proximate an operator seat 20. Interface devices 18 may initiate movement of machine 10 by producing displacement signals that are indicative of a desired machine maneuver and/or mode of operation. In one embodiment, interface devices 18 include a foot pedal 18a and a mode switch 18b. As an operator manipulates foot pedal 18a, the operator may expect and affect a corresponding change in machine travel speed and/or rimpull torque. As the operator pushes or otherwise activates mode switch 18b, performance mode or any number of economy modes of operation may be initiated. It is contemplated that interface devices 18 other than a foot pedal and a switches such as, for example, joysticks, levers, wheels, knobs, dials, and other devices known in the art, may additionally or alternatively be provided within operator station 12 for control of machine 10, if desired. For example, a dial could be used in addition to or instead of foot pedal 18a to set a desired speed.

Figure 3:
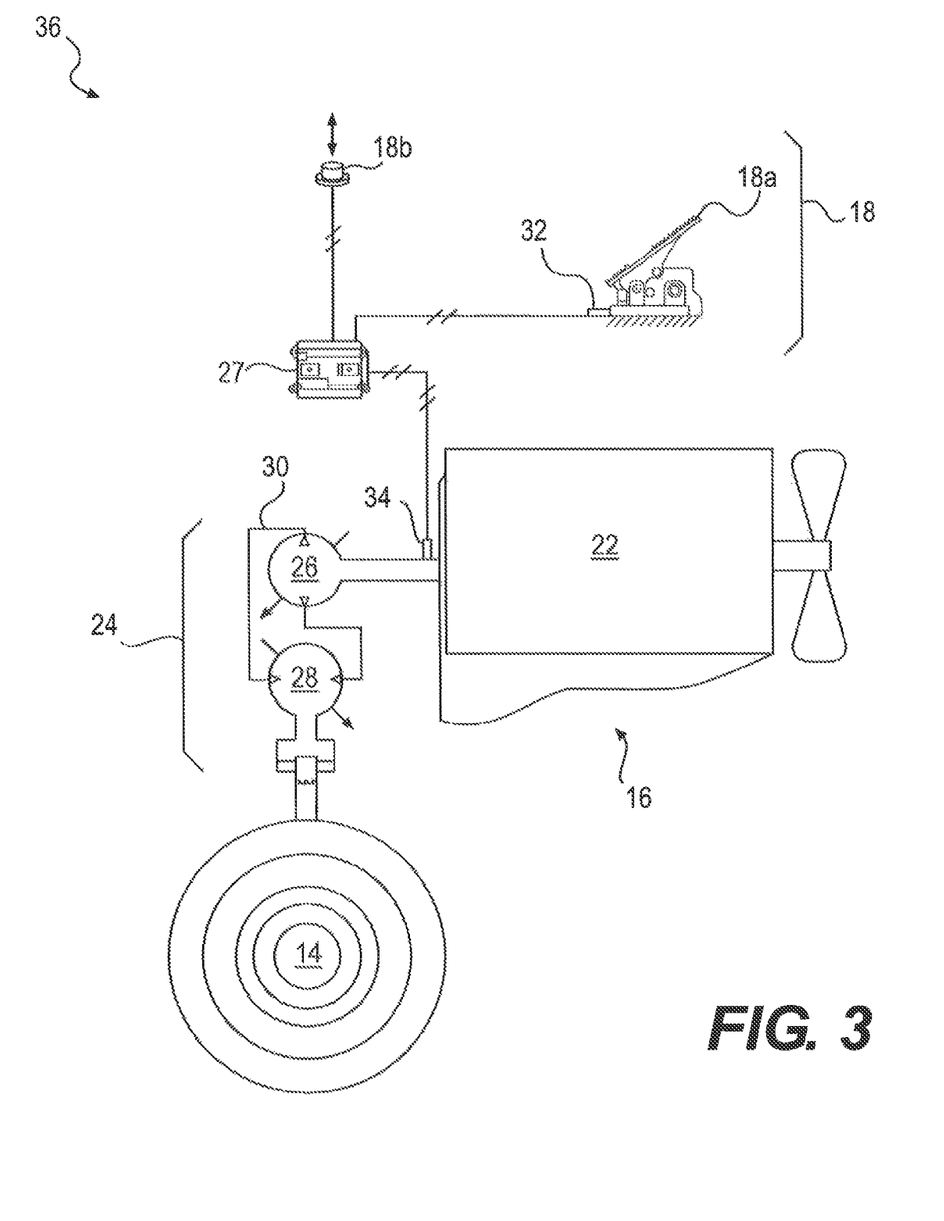
FIG. 3 is a diagrammatic illustration of an exemplary disclosed transmission system for use with the machine of FIG. 1.

As illustrated in FIG. 3, powertrain 16 may be an integral package configured to generate and transmit power to traction devices 14, in particular, powertrain 16 may include a power source 22 operable to generate a power output, a transmission 24 connected to receive the power output and transmit the power output in a useful manner to traction devices 14, and a control module 27 configured to regulate the operations of power source 22 and transmission 24 in response to one or more input (e.g., in response to operator input received via interface devices 18).

Power source 22 may include an internal combustion engine having multiple subsystems that cooperate to produce mechanical and/or electrical power output. For the purposes of this disclosure, power source 22 is depicted and described as a four-stroke diesel engine. One skilled in the art will recognize, however, that power source 22 may be any other type of internal combustion engine such as, for example, a gasoline or a gaseous fuel-powered engine. The subsystems of power source 22 may include, for example, a fuel system, an air induction system, an exhaust system, a lubrication system, a cooling system, and/or any other appropriate system.

Power source 22 may be configured to produce a torque output directed to transmission 24 and to other parasitic loads (e.g., to hydraulic systems, electrical systems, cooling systems, etc.) through a range of speeds. For the purposes of this disclosure, the term Actual Engine Torque may refer to an amount of torque currently being generated by power source 22 at a given speed. In the disclosed embodiment, Actual Engine Torque corresponds directly with an amount of fuel currently being consumed by power source 22 at a given speed. In other words, a measurement of the current fueling rate of power source 22 at a given speed may be used to determine the Actual Engine Torque. The term Available Engine Torque may refer to a maximum amount of torque that could be produced at the given speed when foot pedal 18a is in a fully displaced position. In the disclosed embodiment, Available Engine Torque corresponds directly with a maximum amount of fuel that could be directed into power source 22 at the given speed. In some embodiments, this maximum amount of fuel may be limited at the given speed by a maximum torque limit of the engine, a smoke limit of the engine, or another limit known in the art.

One or more sensors 34 may be associated with power source 22 to sense the speed thereof. In one example, sensor 34 may embody a magnetic pickup type of sensor associated with a magnet embedded within a rotational component of power source 22, such as a crankshaft or flywheel. During operation of power source 22, sensor 34 may detect a rotating field produced by the magnet and generate a signal corresponding to the rotational speed of power source 22. These signals may be directed to control module 27 for further processing.

Transmission 24 may embody a continuously variable transmission (CVT). Transmission 24 may be any type of continuously variable transmission, such as a hydraulic CVT, a hydro-mechanical CVT, an electric CVT, or another CVT configuration as would be apparent to one skilled in the art.

A continuously variable transmission generally consists of a driving element 26, and a driven element 28 that is powered by driving element 26. In the exemplary hydraulic CVT of FIG. 3, driving element 26 is a pump, such as a variable displacement hydraulic pump; and driven element 28 is a motor, such as a variable displacement hydraulic motor configured to receive fluid pressurized by driving element 26. Driving element 26 may be connected to power driven element 28 with pressurized fluid via one or more different conduits in response to a torque command directed to driving and/or driven elements 26, 28 by control module 27. In some situations, driven element 28 may alternatively power driving element 26 in a reverse direction, for example during a braking event.

Although described as a hydraulic CVT, transmission 24 could alternatively embody an electric CVT (or another type of CVT). In the electric CVT configuration, driving element 26 would embody a generator driven by power source 22, and driven element 28 would embody a motor mechanically connected to traction device 14 and configured to receive electricity produced by the generator. Similar to the hydraulic configuration of transmission 24, the motor of the electric configuration may be powered by the generator in response to a torque command from control module 27.

Transmission 24 may be at least partially controlled based on input from foot pedal 18a. That is, as foot pedal 18a is manipulated by an operator, foot pedal 18a may provide signals signifying a desired machine travel speed, an output torque, and/or a desired engine speed. For example, foot pedal 18a may have a minimum displaced position (a.k.a., a neutral position) and be movable through a range of positions to a maximum or fully displaced position. A sensor 32, such as a switch or potentiometer, may be provided in association with foot pedal 18a to sense the displacement position thereof and produce corresponding signals responsive to the displaced position. The displacement signals from sensor 32 may be directed through control module 27 to transmission 24 to control the torque output of driven element 28 and also directed to power source 22 to control fueling thereof.

For example, as foot pedal 18a is displaced to a position further toward the fully displaced position, a signal indicative of a desired increase in travel speed and/or rimpull torque may be created. Control module 27 may then use this signal, alone or in combination with other signals (e.g., signals from sensor 34), to determine an appropriate torque command to be sent to transmission 24 to produce the desired increase in travel speed. Similarly, as foot pedal 18a is displaced more toward the neutral position, a signal indicative of a desired decrease in travel speed and/or rimpull torque may be created and control module 27 may use this signal to determine a corresponding torque command to be sent to transmission 24.

In some instances, the torque command directed to transmission 24 may change without a corresponding change in the displacement position of foot pedal 18a. For example, when traveling at steady state, machine 10 could encounter a hill and begin to speed up or slow down due to the effects of gravity. In either of these situations, control module 27 may sense the undesired change in speed (undesired as no corresponding change in pedal displacement position would have been sensed) and responsively adjust the torque command directed to transmission 24 in order to maintain the desired speed.

As the ratio of transmission 24 is adjusted (based on the torque command from control module 27), transmission 24 may draw varying amounts of power from power source 22. In order to ensure that an adequate supply of power is always available to transmission 24 for unanticipated transient conditions, power source 22 may be capable of generating more torque at a given speed than what is immediately required by transmission 24. For example, power source 22 may normally be allowed, within limits that will be described in more detail below, to produce about 5% more torque than what is directed to transmission 24 (and to the other loads of machine 10). That is, the Available Engine Torque may be maintained at about 5% more than the Actual Engine Torque, within particular limits. It should be noted that a different torque margin may alternatively be utilized, if desired. Control module 27 may be configured to regulate the fueling of power source 22 to maintain the desired margin between Available Engine Torque and Actual Engine Torque.

Control module 27 may embody a single microprocessor or multiple microprocessors that include a means for controlling the operation of powertrain 16 in response to the received signals. Numerous commercially available microprocessors can be configured to perform the functions of control module 27. It should be appreciated that control module 27 could readily embody a general machine microprocessor capable of controlling numerous machine functions. Control module 27 may include a memory, a secondary storage device, a processor, and any other components for running an application. Various other circuits may be associated with control module 27 such as power supply circuitry, signal conditioning circuitry, solenoid driver circuitry, and other types of circuitry.

One or more power source control maps relating the signals from interface devices 18, engine speed, engine fueling, and/or torque limits may be stored within the memory of control module 27. Each of these maps may be in the form of tables, graphs, and/or equations, and include a compilation of data collected from lab and/or field operation of powertrain 16. Control module 27 may reference these maps and control the operation of power source 22 and bring performance of machine 10 in line with operator expectations.

Figure 4:
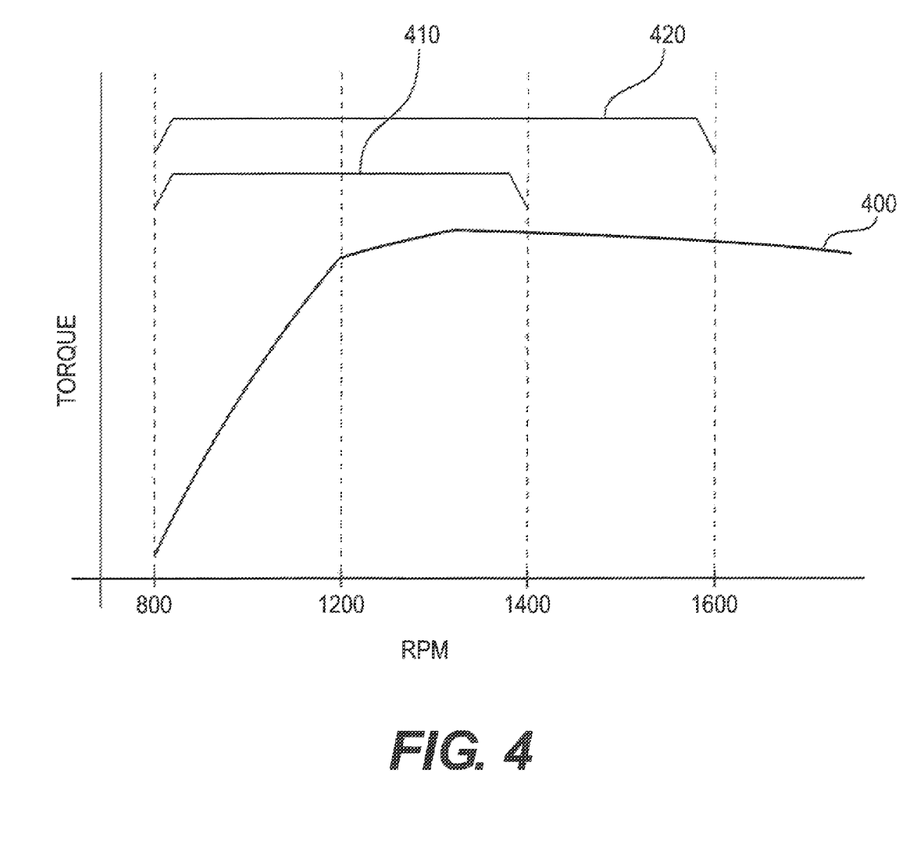
FIG. 4 is an exemplary control map that may be used to control the transmission system of FIG. 3.

An exemplary power source control map is shown in FIG. 4. In this map, a torque limit curve 400 is shown that corresponds with a maximum amount of torque that could be produced by power source 22 at any given speed. This maximum amount of torque may also correspond with a maximum amount of fuel consumed by power source 22 at the given speed. As shown in the map of FIG. 4, the neutral position of foot pedal 18a may correspond with an engine speed of about 800 rpm, and the fully displaced position of foot pedal 18a may correspond with multiple different engine speeds, depending on the mode of operation and the actual or desired margin between the Actual Engine Torque and the Available Engine Torque. For example, the fully displaced position may correspond with a Low Max Limit of about 1200 rpm and a High Max. Limit of about 1400 rpm, when machine 10 is operating in an economy mode. In contrast, the fully displaced position may correspond with a Low Max Limit of about 1400 rpm and a high Max Limit of about 1600 rpm, when machine 10 is operating in a performance mode. Alternatively, the fully displaced position could correspond with a Low Max Limit of about 1200 rpm and the High Max Limit of about 1600 rpm, when machine 10 is operating in the performance mode, if desired. In general, the economy mode of operation is associated with lower values for one or both of the Low and High Max Limits. For example, the Low Max Limit of the economy mode may be about 75% of the performance mode High Max Limit; and the High Max Limit of the economy mode may be about equal to the performance mode Low Max Limit. The control map of FIG. 4 will be discussed in more detail in the following section.

Figure 5:
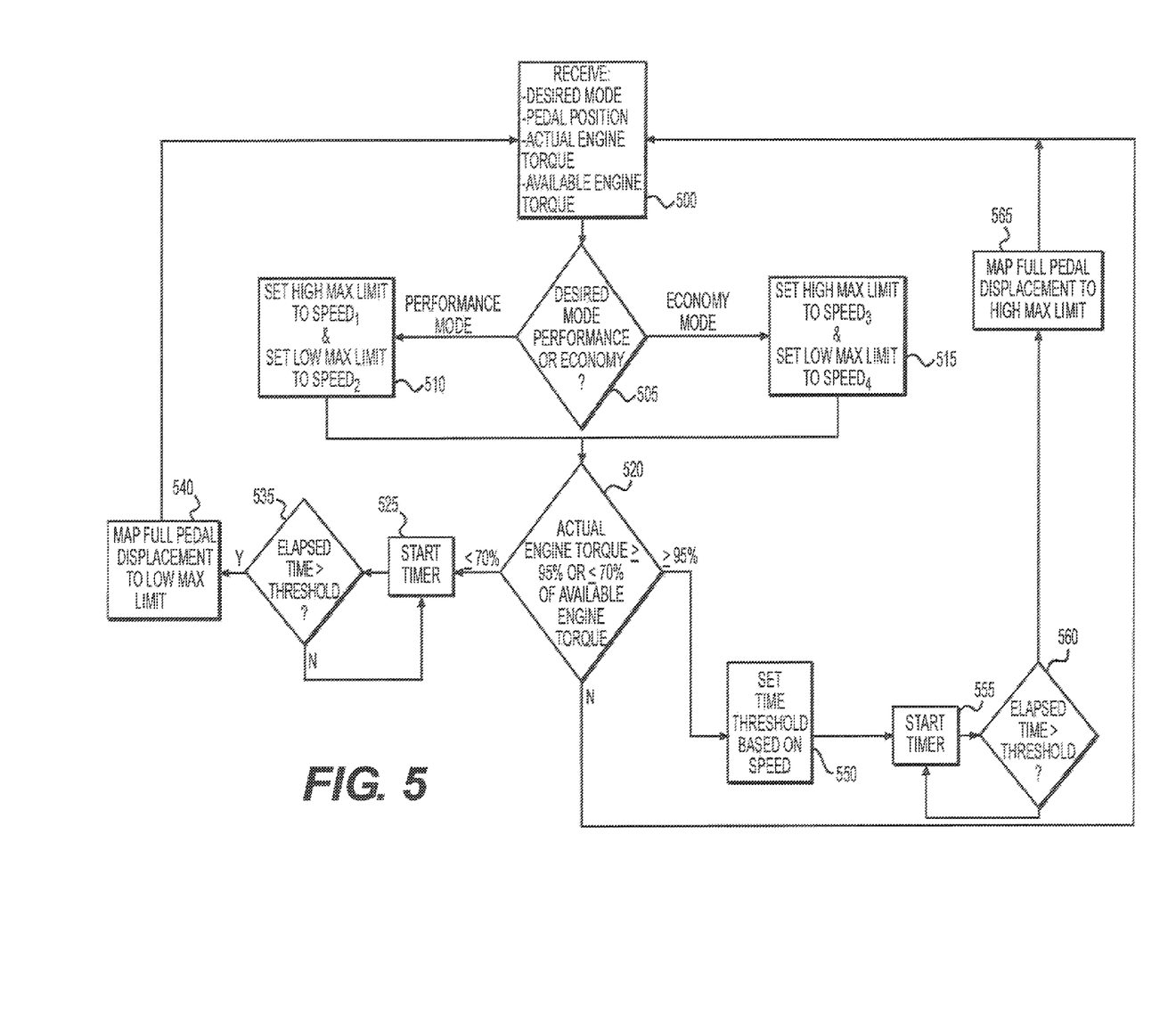
FIG. 5 is a flowchart depicting an exemplary method of operating the transmission system of FIG. 3.

Control module 27, together with power source 22, transmission 24, and interface devices 18, may embody a transmission system 36. FIG. 5 is a flow chart depicting an exemplary method of operating transmission system 36. FIG. 5 will be discussed further in the following section to better illustrate the disclosed system and its operation.

INDUSTRIAL APPLICABILITY

The disclosed transmission system may be applicable to any vehicle having a CVT (e.g., an electric or hydraulic CVT). In particular, by directly controlling both engine fueling and the torque output of a machine's powertrain, operator control of the machine may be improved while also providing better overall vehicle efficiency. In addition, by providing for selective operation within an economy mode, further machine efficiencies may be realized. Operation of transmission system 36 will now be described with reference to the flowchart of FIG. 5.

Operation of transmission system 36 may include receiving a desired mode selection from the operator of machine 10, receiving a displacement position of foot pedal 18a, determining the Actual Engine Torque, and determining the Available Engine Torque (Block 500). As described above, the desired mode may be selected via mode switch 18b, as either a performance mode of operation or an economy mode of operation. In some embodiments, the operator may be able to select one or more increments between a maximum economy mode and a maximum performance mode. Any number of economy modes may be available. The displacement position of foot pedal 18a may be determined based on signals generated by sensor 32. The Actual Engine Torque and the Available Engine Torque may be determined by control module 27, provided to control module 27 by a dedicated power source controller (not shown), and/or generated in another manner known in the art. For example, control module 27 may determine these values based, at least in part, on the current fueling of power source 22 at the current engine speed and the maximum limit of fueling at the current engine speed.

Control module 27 may determine whether the desired mode of operation is the performance mode or one of any available economy modes (Block 505), and respond accordingly. For example, if the desired mode of operation is the performance mode, control module 27 may set the High Max Limit of power source 22 to a first engine speed (e.g., to $Speed_1$), and set the Low Max Limit of power source 22 to a second engine speed that is less than the first engine speed (e.g., to $Speed_2 < Speed_1$) (Block 510). However, if the desired mode of operation is an economy mode, control module 27 may instead set the High Max Limit of power source 22 to a third engine speed that, in the disclosed example, is the same as or less than the second engine speed (e.g., $Speed_3 \leq Speed_2$), and set the Low Max Limit to a fourth engine speed that is less than the third engine speed (e.g., $Speed_4 < Speed_3$) (Block 515). In one example, $Speed_1$ may be a maximum rated speed of power source 22 and about equal to 1600 rpm; $Speed_2$ may be about 85-90% of $Speed_1$ (i.e., about 10-15% less than $Speed_1$ or about 1400 rpm); $Speed_3$ may be about equal to $Speed_2$ (i.e., about 1400 rpm); and $Speed_4$ may be about 75% of $Speed_1$ (i.e., about 1200 rpm). Other values and relationships for $Speeds_{1-4}$ may also be possible.

Control module 27 may then compare the Actual Engine Torque to the Available Engine Torque to determine if the Actual Engine Torque is within a desired margin of the Available Engine Torque. In the exemplary embodiment, control module 27 may determine if the Actual Engine Torque is less than or equal to about 70% of the Available Engine Torque or if the Actual Engine Torque is greater than or equal to about 95% of the Available Engine Torque (Block 520). For example, control module 27 may divide the Actual Engine Torque (i.e., current fueling of power source 22 for the given speed) by the Available Engine Torque (i.e., maximum fueling of power source 22 at a maximum speed currently mapped to full foot pedal displacement). If the Actual Engine Torque is less than or equal to about 70% of the Available Engine Torque (i.e., if there is more than a 30% margin between Available Engine Torque and Actual Engine Torque), control may proceed to block 525. However, if the ratio of the Actual Engine Torque to the Available Engine Torque is more than or equal to about 95% (i.e., if there is less than a 5% margin between Available Engine Torque and Actual Engine Torque), control may proceed to block 550. If the ratio of the Actual Engine Torque to the Available Engine Torque is between about 70% and 95% (block 520:No), control may return to block 500 without any significant system changes.

At block 525, control module 27 may start tracking time, and only proceed after a comparison of elapsed time with a first time threshold (Block 535) indicates that a sufficiently long delay has occurred while the ratio remains less than or equal to 70%. That is, control may loop through blocks 525 and 535 until the amount of elapsed time is equal to or greater than the first time threshold. In one embodiment, the first time threshold may be about 3 seconds, the corresponding pause being long enough to reduce (or even eliminate) system instabilities caused by subsequent pedal remapping. It is contemplated that delays other 3 seconds may be utilized, if desired. After the 3-second delay (or other appropriate delay), control module 27 may map the full displacement position of foot pedal 18a to correspond with the Low Max Limit of the desired mode (e.g., about 1400 rpm for the performance mode and about 1200 rpm for the economy mode—Block 540). Control may then return from block 540 to block 500. At any time during the delay, if the ratio of the Actual Engine Torque to the Available Engine rises above 70%, control may return to step 520.

When advancing from block 520 to block 550, however, control module 27 may utilize a variable time threshold when pausing before pedal remapping. In particular, control module 27 may set the variable time threshold to a value that based on a travel speed of machine 10 (Step 550). For example, when machine 10 is traveling at an elevated speed (e.g., above about 12 kph), the variable time threshold may be a first value (e.g., about 0.4 sec). In another example, when machine 10 is traveling at a low speed (e.g., below about 7 kph), the variable time threshold may be a second value (e.g., about 2 seconds). And when machine 10 is traveling between the high and low speeds, the variable time threshold may have a value between the first and second values. For the purposes of this disclosure, the term "about" may refer to a value that is within engineering tolerances.

In the above examples, the low and high speeds may represent discernible divisions between different tasks being performed by machine 10. For example, when machine 10 is detected to be slower than about 7 kph, it can be concluded that machine 10 is performing a first task (e.g., truck loading). In contrast, when machine 10 is detected to be traveling faster than about 12 kph, machine 10 may be performing a second task (e.g., roading). And when machine 10 is detected to be traveling within the range of about 7-12 kph, the task being performed by machine 10 may be uncertain. The travel speed of machine 10 may be detected based on signals from sensor 34 and a known speed-to-torque ratio of transmission 24. Alternatively, a different sensor (e.g., a dedicated travel speed sensor—not shown) may be utilized, if desired.

After completion of block 550, control module 27 may start its internal timer (Block 555), and then compare an amount of elapsed time to the variable time threshold (Block 560). Control may then loop through blocks 555 and 560, until the elapsed time is equal to or greater than the corresponding variable time threshold while still maintaining the ratio of the Actual Engine Torque to the Available Engine above or equal to 95%. Thereafter, control module 27 may map the full displacement position of foot pedal 18a to correspond with the High Max Limit of the desired mode (e.g., about 1600 rpm for the performance mode and about 1400 rpm for the economy mode) (Block 565). Control may then return from block 565 to block 500. At any time during the delay, if the ratio of the Actual Engine Torque to the Available Engine falls below 95%, control may return to step 520.

In both of blocks 540 and 565, mapping of the foot pedal neutral position may remain unchanged, at about 800 rpm. And as described above, mapping of the foot pedal may result in engine fueling changes and transmission changes. Several examples are provided below to further illustrate blocks 500-530.

In a first example, assume that machine 10 is operating at steady state in the performance mode, wherein the High Max Limit of power source is about 1600 rpm and the Low Max Limit is about 1400 rpm. At this time, the speed of power source 22 may be somewhere between these values, for example at about 1550 rpm. In this situation, the Actual Engine Torque may be fairly close to the Available Engine Torque, for example at about 95%. If machine 10 were to then encounter a decline, Actual Engine Torque (i.e., the current fueling of power source 22) may reduce and, when compared to the Available Engine Torque (i.e., the maximum amount of fueling for the current engine speed), the margin between Actual and Available Engine Torques may grow to more than 30%. In this situation, control module 27 may determine that control should proceed from block 520 through block 540 and therefore reduce the speed of power source 22 corresponding to full pedal displacement to the Low Max Limit or to about 1400 rpm. In other words, when power source 22 no longer requires the higher amount of torque, control module 27 may reduce the maximum speed achievable at full pedal displacement (and, in turn, also the amount of fuel and torque available at the current engine speed) to a lower value that conserves fuel. That is, even if the operator maintains full or nearly full displacement of foot pedal 18a, a drop in Actual Engine Torque may result in an automatic reduction in the speed of power source 22 and a corresponding reduction in fuel consumption. In this same example, if the operator had instead chosen the economy mode of operation, control module 27 would have remapped full pedal displacement from about 1400 rpm to about 1200 rpm.

Now assume that machine 10 encounters an incline during the performance mode of operation, and the Actual Engine Torque increases such that the margin between Actual and Available Engine Torques becomes less than the desired margin (e.g., less than about 5%). In this situation, control module 27 may determine that control should proceed from block 520 through block 565. That is, control module 27 may remap the full displacement position of foot pedal 18a from the Low Max Limit of about 1400 rpm to the High Max Limit of about 1600 rpm. In other words, as the torque requirement of power source 22 starts to increase, control module 27 may raise the raise the maximum speed achievable at full pedal displacement (and, in turn, the maximum amount of fueling and torque available at the current engine speed) to a higher value that provides more torque. That is, even if the operator maintains full or nearly full displacement of foot pedal 18a, an increase in Actual Engine Torque may result in an automatic increase in the speed of power source. In some instances, this may also correspond with an increase in machine performance. In this same example, if the operator had instead chosen the economy mode of operation, control module 27 would have instead remapped full pedal displacement from about 1200 rpm to about 1400 rpm.

It is contemplated that instead of a large step increase from the Low Max Limit to the High Max Limit in response to the margin between Actual and Available Engine Torques falling below about 5%, control module 27 could instead increase power source speed by a smaller amount. For example, control module 27 could increase power source speed by about 50 rpm increments, or increase power source speed linearly to maintain the 5% margin, if desired.

After mapping of pedal displacement has been adjusted, control module 27 may use the new mapping to adjust fueling of power source 22 at the current engine speed and the current foot pedal position. In particular, control module 27 may selectively adjust fueling of power source 22 to correspond with values stored in the map for the current engine speed and for the current displacement position of foot pedal 18a. In other words, by adjusting the maximum displacement position of foot pedal 18a, all positions between the neutral position and the maximum displacement position may be automatically adjusted in the same direction by related amounts. In addition, control module 27 may adjust operation of transmission 24 based on the signal generated by foot pedal 18a and on the map.

High machine efficiency may be realized in association with the disclosed transmission system, as control over fueling of power source 22 may not always directly correspond with operator input. In particular, the operator may manipulate foot pedal 18a without necessarily causing a direct change in fueling of power source 22. Instead, displacement of foot pedal 18a may merely cause a change in the gear ratio of transmission 24 and, only when the change requires a significant increase or decrease in the amount of available torque from power source 22, will the displacement cause a change in fueling of power source 22. However, even when this occurs, the change in fueling may be based on maintaining the desired margin of Available Engine Torque above the Actual Engine Torque and not directly based on the displacement. In other words, power source fueling may be somewhat independent of operator input, allowing for greater engine stability and lower fuel consumption.

In addition, because of the built-in time delays associated with remapping of foot pedal 18a, the remapping may not result in significant system instabilities. These instabilities may be reduced even further by basing the time delays on travel speed, in some situations. In addition with the above logic, the speeds of power source 22 may be kept lower for a greater amount of time during truck loading and other similar operations. This lower speed may help to increase fuel savings during these operations, while also allowing the speeds of power source 22 to ramp up quickly when travelling to improve performance.

It will be apparent to those skilled in the art that various modifications and variations can be made to the disclosed transmission system. Other embodiments will be apparent to those skilled in the art from consideration of the specification and practice of the disclosed transmission system. It is intended that the specification and examples be considered as exemplary only, with a true scope being indicated by the following claims and their equivalents.

What is claimed is:

1. A transmission system for use with a mobile machine, the transmission system comprising:
   a power source configured to generate a torque output;
   a transmission configured to receive at least a portion of the torque output and to drive a traction device in the mobile machine;
   an operator input device movable through a range from a neutral position to a maximum displaced position to generate a signal indicative of a desired torque of the traction device and a desired speed of the power source; and
   a control module in communication with the power source, the transmission, and the operator input device, the control module being configured to:
   reference the signal from the operator input device with a map stored in memory to determine a corresponding speed of the power source;
   determine a margin between an actual and a maximum available torque output of the power source at a current power source speed;
   determine a delay time threshold based on the margin;
   selectively adjust a speed of the power source mapped to the maximum displaced position of the operator input device based on the margin and the delay time threshold; and
   selectively adjust fueling of the power source at a current displacement position of the operator input device and operation of the transmission based on the signal and on the map.

2. The transmission system of claim 1, wherein the control module is further configured to:
   receive a selection from an operator of the mobile machine indicative of desired operation in a performance mode or an economy mode; and
   selectively lower the speed of the power source mapped to the maximum displaced position when the selection is the economy mode.

3. The transmission system of claim 2, wherein the control module is further configured to selectively lower a speed of the power source mapped to the neutral position when the selection is the economy mode.

4. The transmission system of claim 3, wherein the speed of the power source mapped to the maximum displaced position during operation in the economy mode is about the same as the speed of the power source mapped to the neutral position during operation in the performance mode.

5. The transmission system of claim 3, wherein the speed of the power source mapped to the neutral position during operation in the economy mode is about 75% of the speed of the power source mapped to the maximum displaced position during operation in the performance mode.

6. The transmission system of claim 1, wherein the control module is configured to selectively reduce the speed of the power source mapped to the maximum displaced position by about 10-15% when the margin increases past a first threshold.

7. The transmission system of claim 6, wherein the first threshold is about 30%.

8. The transmission system of claim 6, wherein, when the margin increases past the first threshold, the delay time threshold is about 3 seconds.

9. The transmission system of claim 6, wherein the control module is configured to selectively increase the speed of the power source mapped to the maximum displaced position when the margin decreases past about 5%.

10. The transmission system of claim 1, wherein the control module is further configured to set the delay time threshold to a value based on a travel speed of the mobile machine.

11. The transmission system of claim 10, wherein the control module is configured to:
    set the delay time threshold to a first value when the comparison indicates the travel speed is less than a first threshold travel speed;
    set the delay time threshold to a second value when the comparison indicates the travel speed is greater than a second threshold travel speed; and
    set the delay time threshold to a third value when the comparison indicates the travel speed is between the first and second threshold travel speeds.

12. The transmission system of claim 11, wherein the third value is proportional to the travel speed.

13. The transmission system of claim 12, wherein:
    the first value is about 2 seconds; and
    the second value is about 0.4 seconds.

14. A transmission system for a mobile machine having a traction device, the transmission system comprising:
    a power source configured to generate a torque output;
    a continuously variable transmission configured to receive at least a portion of the torque output and to drive the traction device;
    an operator input device movable through a range from a neutral position to a maximum displaced position to generate a signal indicative of a desired torque of the traction device and a desired speed of the power source; and
    a control module in communication with the power source, the continuously variable transmission, and the operator input device, the control module being configured to:
    reference the signal from the operator input device with a map stored in memory to determine a corresponding speed of the power source;
    determine a margin between an actual and a maximum available torque output of the power source at a current speed;
    determine a delay time threshold based on the margin;
    selectively adjust a speed of the power source mapped to the maximum displaced position of the operator input device based on the margin and the delay time threshold;
    selectively adjust fueling of the power source at a current displacement position of the operator input device and operation of the continuously variable transmission based on the signal and on the map;
    selectively reduce the speed of the power source mapped to the maximum displaced position when the margin is about equal to or greater than 30%; and
    selectively increase the speed of the power source mapped to the maximum displaced position when the margin is about equal to or less than 5%.

15. The transmission system of claim 14, wherein:
    when the margin is about equal to or greater than 30%, the delay time threshold is about 3 seconds;

when the margin is about equal to or less than 5%, the control module is further configured to set the delay time threshold to a value based on a travel speed of the mobile machine;

the value is about 2 seconds when the comparison indicates the travel speed is less than a first threshold travel speed;

the value is about 0.4 seconds when the comparison indicates the travel speed is greater than a second threshold travel speed; and the value is proportional to the travel speed when the comparison indicates the travel speed is between the first and second travel speeds.

16. A method of operating a mobile machine having a traction device driven by a power source via a transmission, the method comprising:

determining a displacement position of an operator input device that is indicative of a desired torque of the traction device and a desired speed of the power source;

referencing the displacement position with a map to determine a corresponding speed of the power source;

determining a margin between an actual and a maximum available torque output of the power source at a current speed;

determining a delay time threshold based on the margin;

selectively adjusting a speed of the power source mapped to a maximum displaced position of the operator input device based on the margin and the delay time threshold; and selectively adjusting fueling of the power source at a current displacement position of the operator input device and operation of the transmission based on the displacement position and on the map.

17. The method of claim 16, further including:

receiving a selection from an operator of the mobile machine indicative of desired operation in a performance mode or an economy mode; and selectively lowering the speed of the power source mapped to the maximum displaced position when the selection is the economy mode.

18. The method of claim 16, further including:

selectively reducing the speed of the power source mapped to the maximum displaced position by about 10-15% when the margin increases past about 30%; and selectively increasing the speed of the power source mapped to the maximum displaced position when the margin decreases past about 5%, wherein, when the margin increases past about 30%, the delay time threshold is about 3 seconds.

19. The method of claim 16, further including setting the delay time threshold to a value based on a travel speed of the mobile machine.

20. The method of claim 19, further including:

setting the delay time threshold to a first value when the comparison indicates the travel speed is less than a first threshold travel speed;

setting the delay time threshold to a second value when the comparison indicates the travel speed is greater than a second threshold travel speed; and setting the delay time threshold to a third value proportional to the travel speed when the comparison indicates the travel speed is between the first and second threshold travel speeds.

* * * * *